US012418123B2

(12) United States Patent
Chen

(10) Patent No.: US 12,418,123 B2
(45) Date of Patent: Sep. 16, 2025

(54) ELECTRICAL CONNECTOR, BOARD-TO-BOARD CONNECTOR, AND ELECTRONIC DEVICE

(71) Applicant: XIAMEN GHGM INDUSTRIAL TRADE CO., LTD, Xiamen (CN)

(72) Inventor: Bingshui Chen, Xiamen (CN)

(73) Assignee: XIAMEN GHGM INDUSTRIAL TRADE CO., LTD, Xiamen (CN)

( * ) Notice: Subject to any disclaimer, the term of this patent is extended or adjusted under 35 U.S.C. 154(b) by 302 days.

(21) Appl. No.: 18/449,719

(22) Filed: Aug. 15, 2023

(65) Prior Publication Data

US 2024/0405462 A1 Dec. 5, 2024

(30) Foreign Application Priority Data

May 31, 2023 (CN) ........................ 202310638266.8

(51) Int. Cl.
*H01R 12/71* (2011.01)
*H01R 13/11* (2006.01)

(52) U.S. Cl.
CPC ......... *H01R 12/716* (2013.01); *H01R 13/112* (2013.01)

(58) Field of Classification Search
CPC ...... H01R 12/716; H01R 12/73; H01R 12/57; H01R 13/112; H01R 13/2442; H01R 13/405
See application file for complete search history.

(56) References Cited

U.S. PATENT DOCUMENTS

2010/0167569 A1* 7/2010 Stoner .................. H01R 13/193 439/284
2014/0127950 A1* 5/2014 Fang .................... H01R 13/405 439/676
2016/0126654 A1* 5/2016 Hashiguchi .............. H01R 4/16 439/851
2021/0242616 A1* 8/2021 Omodachi ......... H01R 12/7005
2024/0186736 A1* 6/2024 Jiang .................... H01R 13/424

FOREIGN PATENT DOCUMENTS

CN 101490906 B * 9/2014 ........... H01R 12/716

* cited by examiner

*Primary Examiner* — Zheng Song

(57) ABSTRACT

An electrical connector, a board-to-board connector, and an electronic device are provided. The electrical connector includes a first insulating shell and electrical connecting components. The electrical connecting components are disposed on the first insulating shell. Each of the electrical connecting components includes a fixing portion, a connecting portion, and a contact portion. An upper end of the connecting portion is bent to form the fixing portion, the connecting portion extends into the first insulating shell and is embedded in the first insulating shell, a lower end of the connecting portion is bent to form the contact portion, the contact portion faces outward and is bent upward and downward to protrude a free end, and the free end is electrically connected to an external electrical contact sheet. The contact portion includes an upper contact and a lower contact.

10 Claims, 7 Drawing Sheets

ELECTRICAL CONNECTOR, BOARD-TO-BOARD CONNECTOR, AND ELECTRONIC DEVICE

TECHNICAL FIELD

The present disclosure relates to a technical field of electrical connectors, and in particular to an electrical connector, a board-to-board connector, and an electronic device.

BACKGROUND

With rapid development of electronic technology, board-to-board connectors are more widely applied, and the board-to-board connectors are generally configured to be in wiring connection with circuit boards, each mainly including a plug and a socket, where the plug and the socket each is composed of a plastic body and a connecting component fixed on the plastic body. The plastic body is mainly configured to insulate and position the connecting component, and the connecting component is mainly configured to be electrically conductive. In a process of connecting the plug with the socket, the socket and the plug are respectively mounted to a main board of an electronic device and a circuit board of an electronic device module through a surface mount technology, the socket and the plug are connected in a male-female plug-in manner, thereby connecting the main board of the electronic device with the circuit board of the electronic device.

However, in the process of connecting the plug and the socket, the plug and the socket need to be aligned, and if the plug and the socket are forcibly connected, the plug and the socket may be damaged, which causes maintenance and replacement of the plug and the socket, thereby increasing a maintenance cost. Moreover, the connecting component of the plug may be staggered with the connecting component of the socket, thereby directly affecting reliability of contact between the plug and the socket. According to electric connection mode between two terminals in the prior art, plugging or removing the electrical connector too many times may easily causes plastic deformation, and in particular, the connecting component of the plug may easily lose original elasticity, thereby causing that the socket and plug may not be in close contact, and even the contact between the plug and the socket is unstable, thereby causing failure of the electric connector. In addition, according to connecting components in the prior art, contact connectivity between the connecting components of the plug and the socket is relatively poor, and even one connecting component may not be effectively in electrical contact fit with another connecting component, thereby resulting in poor stability in electrical contact.

SUMMARY

Based on above, the present disclosure aims to provide an electrical connector, a board-to-board connector, and an electronic device to solve above problems.

The present disclosure provides following solutions.

The present disclosure provides an electrical connector, including a first insulating shell and electrical connecting components. The electrical connecting components are disposed on the first insulating shell. Each of the electrical connecting components includes a fixing portion, a connecting portion, and a contact portion. An upper end of the connecting portion is bent to form the fixing portion, the connecting portion extends into the first insulating shell and is embedded in the first insulating shell, a lower end of the connecting portion is bent to form the contact portion, the contact portion faces outward and is bent upward and downward to protrude a free end, and the free end is electrically connected to an external electrical contact sheet. The contact portion includes an upper contact and a lower contact, the upper contact and the lower contact are capable of being matched with the external electrical contact sheet, a distance between the upper contact and the connecting portion is greater than a distance between the lower contact and the connecting portion, so that both the upper contact and the lower contact are capable of being stably in electrical contact with the external electrical contact sheet.

Furthermore, the contact portion is M-shaped, a head end of the contact portion form a rounded corner with the connecting portion, and a tail end of the contact portion is bent upward and downward to be close to an outer end surface of the connecting portion. After the upper contact and the lower contact are in electrical contact with the external electrical contact sheet, an internal stress borne by the upper contact is smaller than an internal stress borne by the lower contact, so that the lower contact always receives a forward force provided by the external electrical contact sheet.

Furthermore, each of the electrical connecting components is integrally formed by bending a plate, a distance difference between the upper contact and the lower contact is h, a thickness of each of the electrical connecting components is d, and the distance difference h is ½ to 3 times of the thickness d.

Furthermore, the tail end of the contact portion is configured to elastically abut against the connecting portion at least after being in electrical contact with the external electrical contact sheet, so as to provide a reaction force to the contact portion, thereby increasing the forward force.

Furthermore, the connecting portion is configured to deflect with respect to a longitudinal axis after the contact portion is in electrical contact with the external electrical contact sheet, so as to adaptively implement a close contact fit.

Furthermore, a mounting cavity is defined in the first insulating shell, the electrical connecting components are detachably embedded in the mounting cavity, and a clearance is formed between the connecting portion and the mounting cavity.

Furthermore, the fixing portion is bent at a right angle and horizontally extends to form a step position, the step position is configured to prevent residual soldering flux from slipping to the connecting portion and the contact portion; the connecting portion leans against an inner wall of the mounting cavity, and the clearance between the connecting portion and the mounting cavity gradually increases from top to bottom.

Furthermore, a convex rib structure is disposed on the connecting portion, the convex rib structure extends along a width direction of the connecting portion, and the convex rib structure is integrally formed above the connecting portion for being in interference fit with the mounting cavity, so that a lower portion of the connecting portion is in a free state.

The present disclosure further provides a board-to-board connector, including the electrical connector and a connector being in plug-in fit with the electrical connector. the connector includes a second insulating shell and electrical contact sheets, the electrical contact sheets are disposed on the second insulating shell, and the first insulating shell is plugged into the second insulating shell, so as to electrically connect the electrical connecting components with the electrical contact sheets.

The present disclosure further provides an electronic device, including the board-to-board connector.

According to the electric connector of the present disclosure, the fixing portion and the contact portion on each of the electric connecting components are respectively bent at two ends of the connecting portion, and the contact portion at least includes the upper contact and the lower contact, which is configured to be electrically connected to the external electrical contact sheet in a double-contact manner. In particular, there is difference between the distance between the upper contact and the connecting portion and the distance between the lower contact and the connecting portion, and the upper contact protrudes outwards with respect to the lower contact, so that when the upper contact and the lower contact are in electrical contact with the external electrical contact sheet and the lower contact is ensured to abut against the external electrical contact sheet, the upper contact must be electrically connected to the external electrical contact sheet stably. On one hand, the external electrical contact sheet may be quickly connected to the contact portion, and on another hand, elastic connection between the lower contact and the external electrical contact sheet may be improved, so that elastic contact of the lower contact acting on the external electrical contact sheet is greater than elastic contact of the upper contact acting on the external electrical contact, an elastic force from the contact portion to the external electrical contact sheet is obviously improved, thereby achieving more stable and efficient cooperation for electrical connection.

Figure 1:
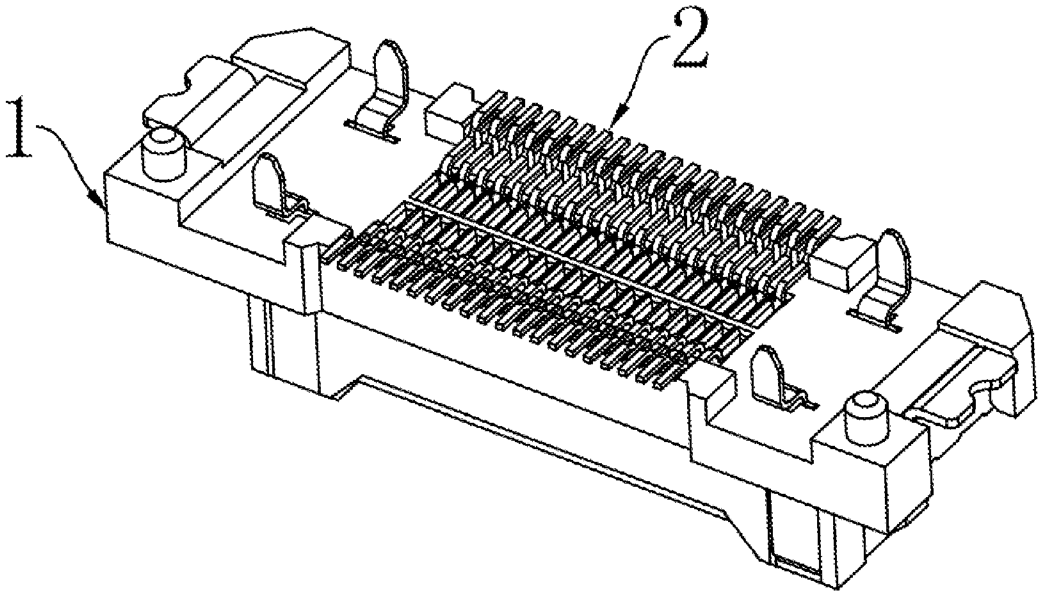
FIG. 1 is a structural schematic diagram of an electrical connector according to one embodiment of the present disclosure.
Figure 2:
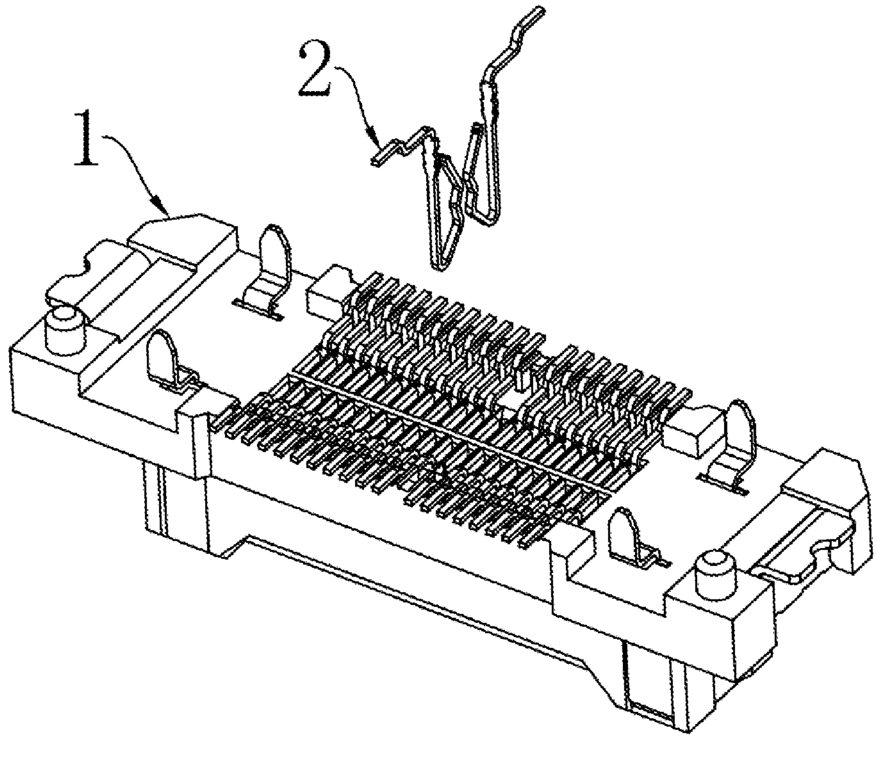
FIG. 2 is a schematic diagram of a partial exploded view of the electrical connector shown in FIG. 1.
Figure 3:
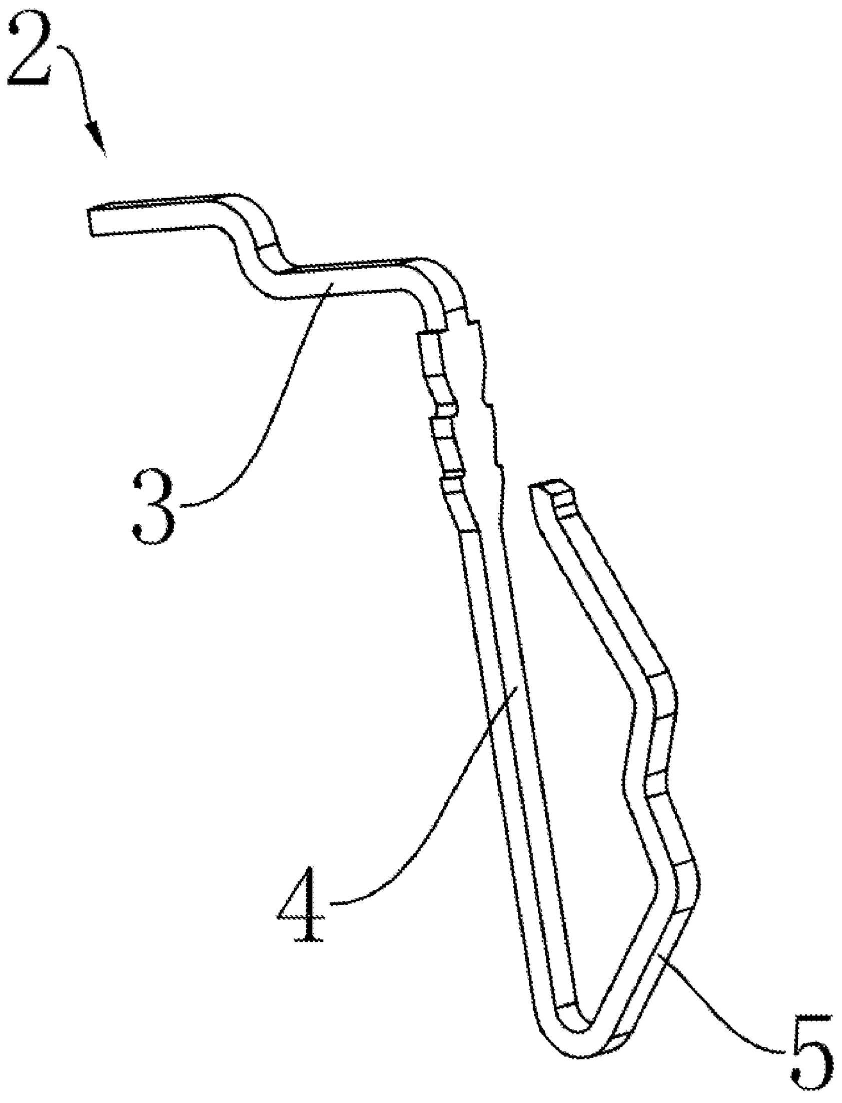
FIG. 3 is a structural schematic diagram of a first perspective view of an electrical connecting component of the electrical connector according to one embodiment of the present disclosure.

Reference numerals in the drawings: 1. first insulating shell; 2. electrical connecting component; 3. fixing portion; 4. connecting portion; 5. contact portion; 6. mounting cavity; 7. limiting groove; 8. convex rib structure; 9. upper contact; 10. lower contact; 11. second insulating shell; 12. electrical contact sheet.

DETAILED DESCRIPTION

In order to make objectives, technical solutions and advantages of the embodiments of the present disclosure clearer, the technical solutions in the embodiments of the present disclosure are clearly and completely described below with reference to accompanying drawings in the embodiments of the present disclosure. Obviously, the described embodiments are part of the embodiments of the present disclosure, rather than all embodiments. All other embodiments obtained by those who skilled in the art based on the embodiments of the present disclosure without creative efforts shall fall within protection scopes of the present disclosure. Therefore, following detailed description of the embodiments of the present disclosure provided in the accompanying drawings is not intended to limit the protection scopes of the present disclosure, but merely represents a selected embodiment of the present disclosure. All other embodiments obtained by those who skilled in the art based on the embodiments of the present disclosure without creative efforts shall fall within the protection scopes of the present disclosure.

As shown in FIGS. 1-10, the present disclosure provides an electrical connector, including a first insulating shell 1 and electrical connecting components 2. The electrical connecting components 2 are disposed on the first insulating shell 1. Each of the electrical connecting components 2 includes a fixing portion 3, a connecting portion 4, and a contact portion 5. An upper end of the connecting portion 4 is bent to form the fixing portion 5, the connecting portion 4 extends into the first insulating shell 1 and is embedded in the first insulating shell 1, a lower end of the connecting portion 4 is bent to form the contact portion 5, the contact portion 5 faces outward and is bent upward and downward to protrude a free end, and the free end is electrically connected to an electrical contact sheet 12. The contact portion 5 includes an upper contact 10 and a lower contact 9, the upper contact 10 and the lower contact 9 are capable of being matched with the electrical contact sheet 12, a distance between the upper contact 9 and the connecting portion 4 is greater than a distance between the lower contact 10 and the connecting portion 4, so that both the upper contact 9 and the lower contact 10 are capable of being stably in electrical contact with the external electrical contact sheet 12.

According to the electric connector of the present disclosure, the fixing portion 3 and the contact portion 5 on each of the electric connecting components 2 are respectively bent at two ends of the connecting portion 4, and the contact portion 5 at least includes the upper contact 9 and the lower contact 10, which is configured to be electrically connected to the electrical contact sheet 12 in a double-contact manner. In particular, there is difference between the distance between the upper contact 9 and the connecting portion 4 and the distance between the lower contact 10 and the connecting portion 4, and the upper contact 9 protrudes outwards with respect to the lower contact 10, so that when the upper contact 9 and the lower contact 10 are in electrical contact with the electrical contact sheet 12 and the lower contact 10 is ensured to abut against the electrical contact sheet 12, the upper contact 9 must be electrically connected to the electrical contact sheet 12 stably. On one hand, the electrical contact sheet 12 may be quickly connected to the contact portion 5, and on another hand, elastic connection between the lower contact 10 and the external electrical contact sheet 12 may be improved, so that elastic contact of the lower contact 10 acting on the electrical contact sheet 12 is greater than elastic contact of the upper contact 9 acting on the electrical contact 12, an elastic force from the contact portion 5 to the electrical contact sheet 12 is obviously improved, thereby achieving more stable and efficient cooperation for electrical connection.

Figure 4:
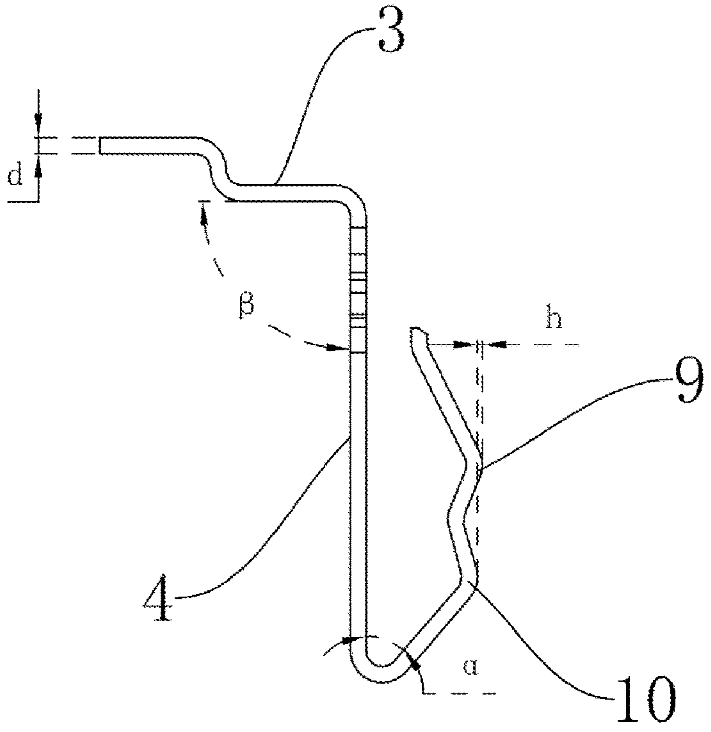
FIG. 4 is a structural schematic diagram of a second perspective view of the electrical connecting component of the electrical connector shown in FIG. 3.
Figure 5:
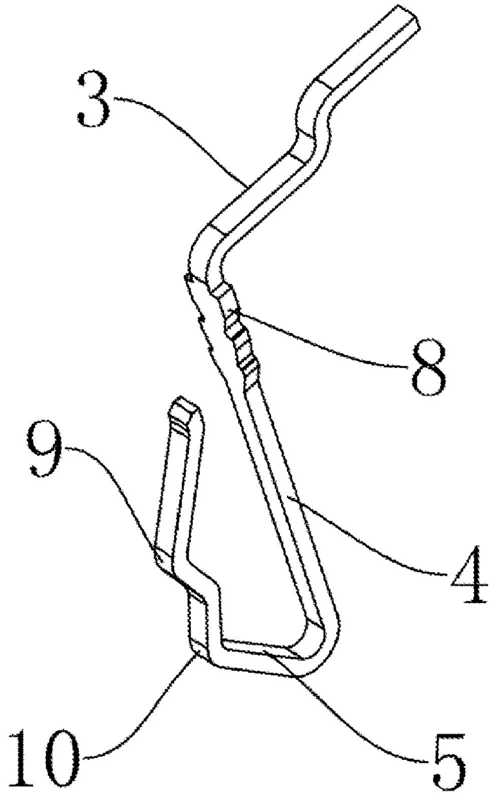
FIG. 5 is a structural schematic diagram of a third perspective view of the electrical connecting component of the electrical connector shown in FIG. 3.
Figure 6:
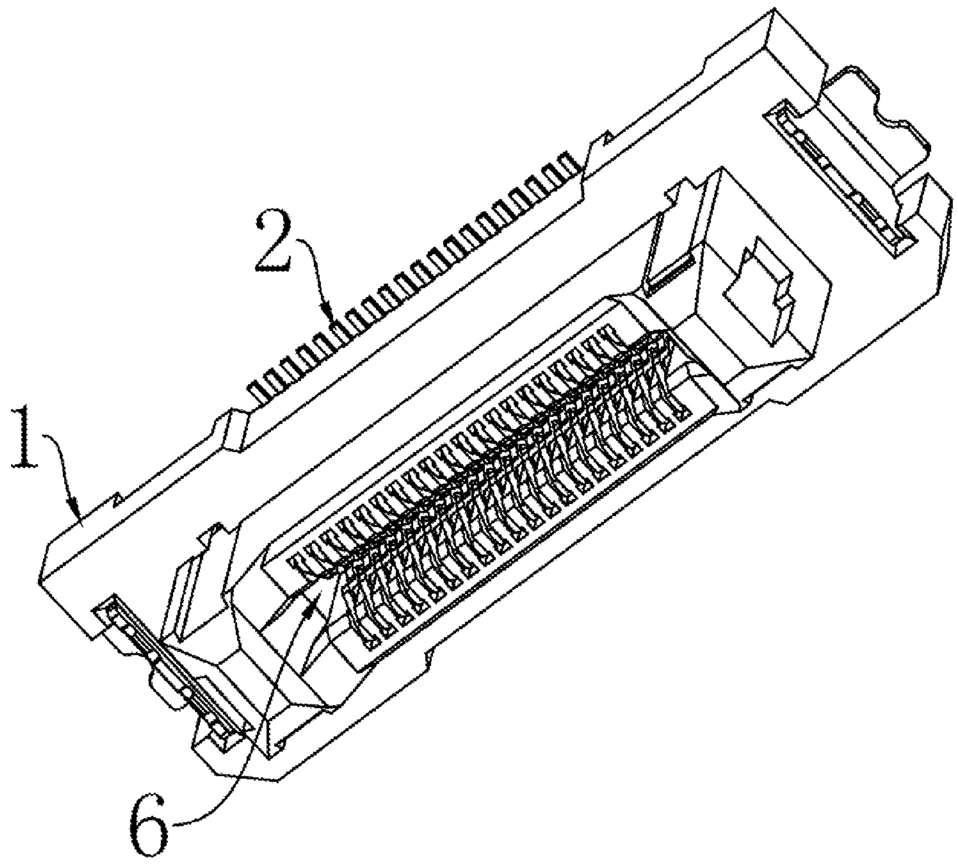
FIG. 6 is another structural schematic diagram of an electrical connector according to one embodiment of the present disclosure
Figure 7:
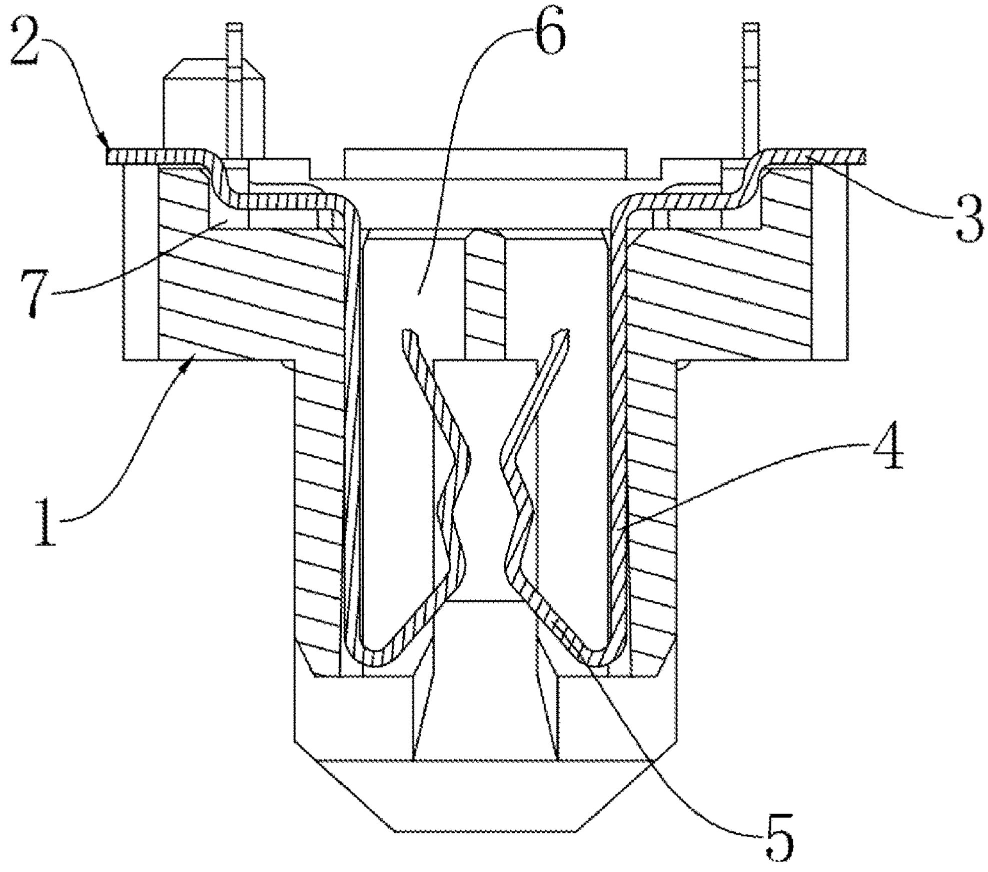
FIG. 7 is a cross-sectional schematic diagram of the electrical connector according to one embodiment of the present disclosure.

As shown in FIGS. 4 and 5, in one embodiment, the contact portion 5 is M-shaped, so as to form at least two contacts to cooperate with the electrical contact sheet 12. A head end of the contact portion 5 form a rounded corner α with the connecting portion 4, and a tail end of the contact portion 5 is bent upward and downward to be close to an outer end surface of the connecting portion 4. Each of the electrical connecting components 2 is integrally formed by bending a plate, and integrally forming the fixing component 3, the connecting portion 4, and the contact portion 5 enables overall connectivity and an elastic force of the electrical connector better, and further facilitates mass production and manufacturing of the electrical connector.

After the upper contact 9 and the lower contact 10 are in electrical contact with the electrical contact sheet 12, an internal stress borne by the upper contact 9 is smaller than an internal stress borne by the lower contact 10, so that the lower contact 10 always receives a forward force provided by the electrical contact sheet 12. It may be understood that after the contact portion 5 abuts against the electrical contact sheet 12, each of the upper contact 9 and the lower contact 10 of the contact portion 5 elastically abuts against the electrical contact sheet 12, at this time, an internal stress of the upper contact 9 and a forward force borne by the upper contact 9 from the electrical contact sheet 12 are both an acting force and a reaction force, and an internal stress of the lower contact 10 and a forward force borne by the lower contact 10 from the electrical contact sheet 12 are also both the acting force and the reaction force, and for the entire contact portion 5, the internal stress of the lower contact 10 needs to additionally deduct the internal stress of the upper contact 9. Therefore, in order to ensure that the lower contact 10 may receive the forward force from the electrical contact sheet 12, the forward force needs to be greater than zero, so that the internal stress of the lower contact 10 is greater than the internal stress of the upper contact 9, which may ensure that the lower contact 10 always elastically abuts against the electrical contact sheet 12.

Specifically, a distance difference between the upper contact 9 and the lower contact 10 is h, a thickness of each of the electrical connecting components 2 is d, the distance difference h is ½ to 3 times of the thickness d, and the distance difference h is within 0.45 mm. Furthermore, the thickness d is 0.15 mm, and when a corresponding distance difference h is 0.15 mm, contact connections between the upper contact 9 and the lower contact 10 respectively with the electrical contact sheet 12 are more stable and efficient. In addition, the rounded corner α between the contact portion 5 and the connecting portion 4 ranges from 40° to 45°, and a bending angle β between the fixing portion 3 and the connecting portion 4 is 90°, so that each of the electrical connecting components 2 is more reasonably and effectively bent, so as to reduce an internal stress of each of the electrical connecting components 2.

Specifically, the tail end of the contact portion 5 is configured to elastically abut against the connecting portion 4 at least after being in electrical contact with the electrical contact sheet 5, so as to provide a reaction force to the contact portion 5, thereby increasing the forward force. Since an internal stress of the tail end of the contact portion 5 is additionally added, the internal stress of the lower contact 10 needs to be correspondingly increased to meet the forward force provided by the electrical contact sheet 5. Therefore, after being connected through wires, the electrical contact sheet 12 is in contact with the contact portion 5 and presses the contact portion 5 to generate a pressing force, a first part of the pressing force is counteracted by a resilience force of the contact portion 5, and a second part of the pressing force abuts against the connecting portion 4 through the tail end of the contact portion 5 and is counteracted by the reaction force provided for the tail end of the contact portion 5 by the connecting portion 4, thereby significantly improving contact load of the contact portion 5 and obviously improving use intensity of the electrical connector.

As shown in FIGS. 4-7, in the embodiment, the connecting portion 4 is configured to deflect with respect to a longitudinal axis after the contact portion 5 is in electrical contact with the electrical contact sheet 12, so as to adaptively implement a close contact fit. Therefore, the fixing portion 3 and the contact portion 5 on each of the electrical connecting components 2 are correspondingly bent at the two ends of the connecting portion 4, and after the contact portion 5 bent forward of the connecting portion 4 is in contact, the connecting portion 4 may deflect with respect to the longitudinal axis, thereby greatly improving elastic forces of the electrical connecting components 2, ensuring that the contact portion 5 is in closer contact with and electrically connected to the electrical contact sheet 12, particularly effectively avoiding a problem of elastic force reduction or failure at a bending position, improving a service life of each of the electrical connecting components 2 of the electrical connector, facilitating alignment and plugging of the electrical connector, and further achieving more stable cooperation for the electrical connection.

In one embodiment, a mounting cavity 6 is defined in the first insulating shell 1, the electrical connecting components 2 are detachably embedded in the mounting cavity 6, and a clearance is formed between the connecting portion 4 and the mounting cavity 6. Therefore, the electrical connecting components 2 are disposed in the mounting cavity 6, the connecting portion 4 of each of the electrical connecting components 2 is specifically disposed in the mounting cavity 6, so that the connecting portion 4 may deflect and reset at least with respect to the longitudinal axis, and after the contact portion 5 is abutted against the electrical contact sheet 12, the connecting portion 4 is correspondingly deflected inward to improve a flexible force during male-female plug-in process, and the connecting portion after being deflected 4 may further provide a resilience force for the contact portion 5 to be in close contact with the electrical contact sheet 12, so as to ensure stability of the electrical connection. After the electrical contact sheet 12 is away from the contact portion 5, the connecting portion 4 is elastically reset to an initial state, so as to significantly improve the service life of each of the electrical connecting components 2, thereby greatly reducing maintenance and replacement costs of the electrical connector.

Furthermore, the fixing portion 3 is bent at a right angle and horizontally extends out of the first insulating shell 1. The connecting portion 4 leans against an inner wall of the mounting cavity 6, and the clearance between the connecting portion 4 and the inner wall of the mounting cavity 6 gradually increases from top to bottom. In one embodiment, a limiting groove 7 is correspondingly defined on the first insulating shell 1 for clamping and limiting the fixing portion 3, and after the connecting portion 4 and the contact portion 5 are embedded into the inner wall of the mounting cavity 6, the fixing portion 3 is mounted and aligned on the limiting groove 7. In addition, after the electrical connecting components 2 are mounted on the first insulating shell 1, the connecting portion 4 is in clearance fit with the mounting cavity 6, and the clearance between the connecting portion 4 and the mounting cavity 6 is maximized at bottom, so that the connecting portion 4 further drives the contact portion 5 to more flexibly swing.

It should be mentioned that, the fixing portion 3 is bent at the right angle and mounted in the limiting groove 7, the connecting portion 4 is vertically arranged in the vertical direction, and the inner wall of the mounting cavity 6 is gradually thinned from top to bottom with respect to wall thicknesses, so as to form an internal space that abuts against the connecting portion 4 until avoiding the connecting portion 4. In one embodiment, the fixing portion 3 horizontally extends to form a step position, and the step position is configured to prevent residual soldering flux from slipping to the connecting portion and the contact portion 5, so as to achieve a purpose of protection.

In one embodiment, a convex rib structure 8 is disposed on the connecting portion 4, the convex rib structure 8 extends along a width direction of the connecting portion 4, and the convex rib structure 8 is integrally formed above the connecting portion 4 for being in interference fit with the mounting cavity 6, so that a lower portion of the connecting portion 4 is in a free state. The connecting portion 4 is mounted and fixed in the mounting cavity 6 through the convex rib structure 8, so that at least an upper half part of the connecting portion 4 may be restrained, and a lower half part of the connecting portion 4 may be controlled to deflect.

Figure 8:
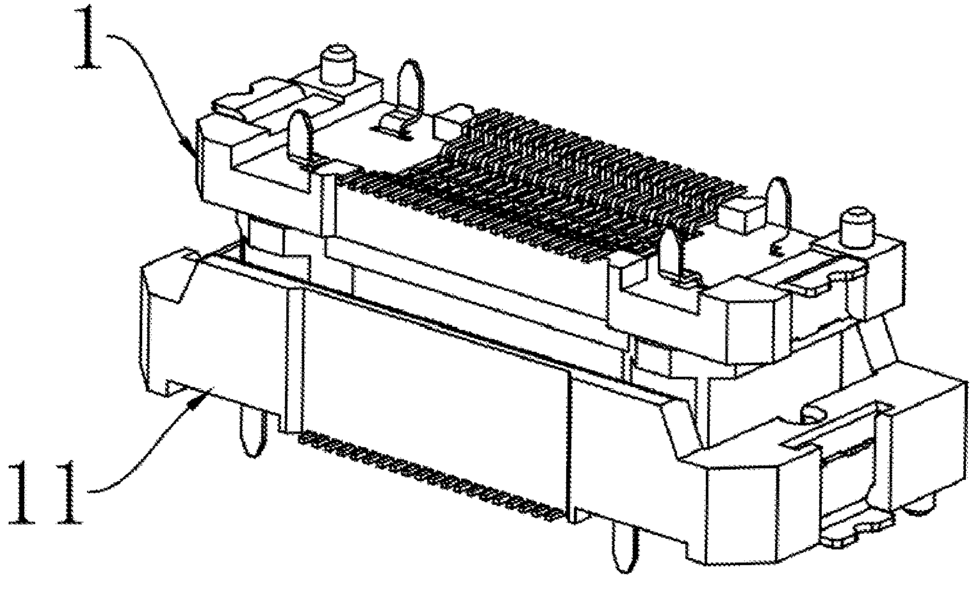
FIG. 8 is a structural schematic diagram of a board-to-board electrical connector according to one embodiment of the present disclosure.
Figure 9:
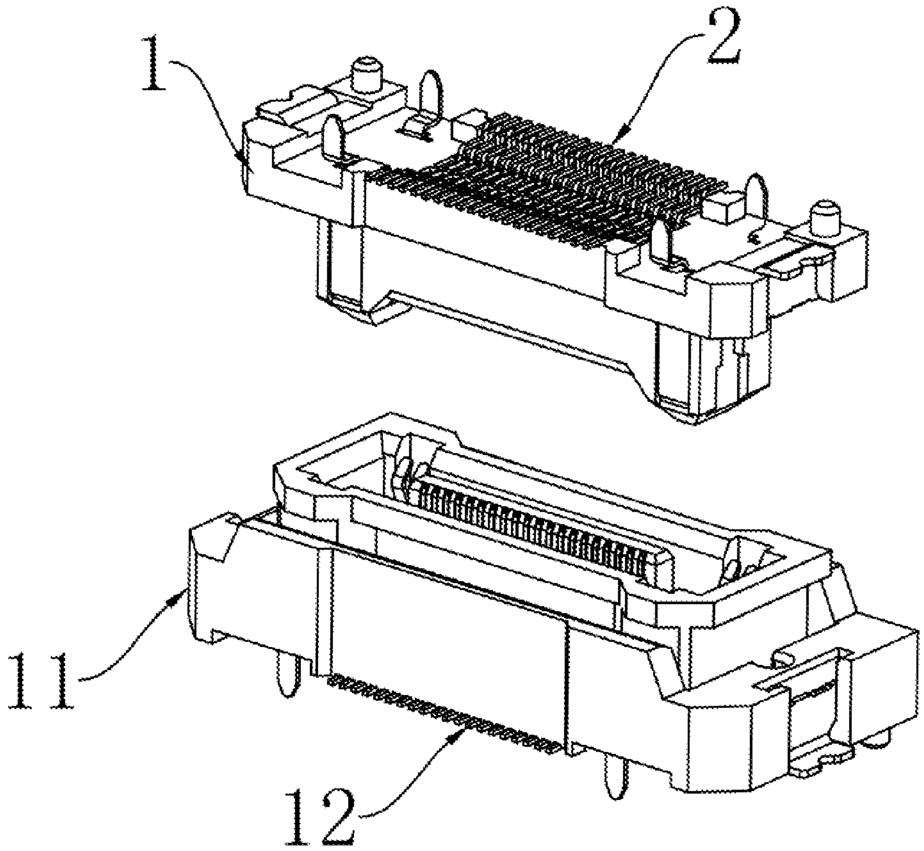
FIG. 9 is a schematic diagram of the board-to-board electrical connector according to one embodiment of the present disclosure, where the electrical connector and a connector are separated.
Figure 10:
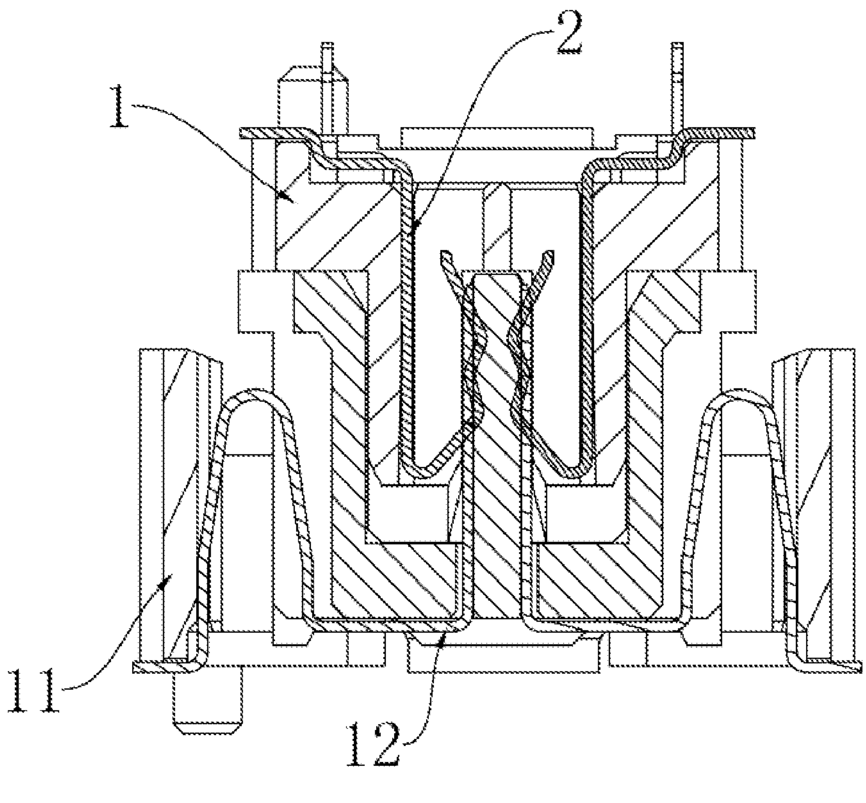
FIG. 10 is a cross-sectional schematic diagram of the board-to-board electrical connector according to one embodiment of the present disclosure.

As shown in FIGS. 8-10, the present disclosure further provides a board-to-board connector, including a connector and the electrical connector. The connector includes a second insulating shell 11 and electrical contact sheets 12, the electrical contact sheets 12 are disposed on the second insulating shell 11, and the first insulating shell 1 is plugged into the second insulating shell 11, so as to electrically connect the electrical connecting components 2 with the electrical contact sheets 12. The electrical connector is plugged into the connector in an alignment manner, so that the electrical connecting components 2 may at least be in contact fit with the electrical contact sheets 12 through the contact portion 5 of each of the electrical connecting components 2, so as to achieve close contact between the electrical connecting components 2 and the electrical contact sheets 12.

It should be understood that a plurality of the electrical connecting components 2 are correspondingly disposed on the electrical connector, where the plurality of the electrical connecting components 2 are regularly arranged, and two rows of the plurality of the electrical connecting components 2 are oppositely arranged in the mounting cavity 6, and corresponding to the plurality of the electrical connecting components 2, and the same number of the electrical contact sheets 12 is disposed on the connector In addition, the present disclosure further provides an electronic device, including the board-to-board connector. Obviously, the board-to-board connector included in the electronic device may be widely applied to fields of high-speed connection, new energy, and various types of power consumption.

The above are only preferred embodiments of the present disclosure, and the protection scopes of the present disclosure are not limited to the above embodiments, and the technical solutions of the present disclosure fall within the protection scopes of the present disclosure.

What is claimed is:

1. An electrical connector, comprising:

a first insulating shell; and electrical connecting components;

wherein the electrical connecting components are disposed on the first insulating shell; each of the electrical connecting components comprises a fixing portion, a connecting portion, and a contact portion; an upper end of the connecting portion is bent to form the fixing portion, the connecting portion extends into the first insulating shell and is embedded in the first insulating shell, a lower end of the connecting portion is bent to form the contact portion, the contact portion faces outward and is bent upward and downward to protrude a free end, and the free end is electrically connected to an external electrical contact sheet; and the contact portion comprises an upper contact and a lower contact, the upper contact and the lower contact are capable of being matched with the external electrical contact sheet, a distance between the upper contact and the connecting portion is greater than a distance between the lower contact and the connecting portion, so that both the upper contact and the lower contact are capable of being stably in electrical contact with the external electrical contact sheet.

2. The electrical connector according to claim 1, wherein the contact portion is M-shaped, a head end of the contact portion form a rounded corner with the connecting portion, and a tail end of the contact portion is bent upward and downward to be close to an outer end surface of the connecting portion; after the upper contact and the lower contact are in electrical contact with the external electrical contact sheet, an internal stress borne by the upper contact is smaller than an internal stress borne by the lower contact, so that the lower contact always receives a forward force provided by the external electrical contact sheet.

3. The electrical connector according to claim 2, wherein each of the electrical connecting components is integrally formed by bending a plate, a distance difference between the upper contact and the lower contact is h, a thickness of each of the electrical connecting components is d, and the distance difference h is ½ to 3 times of the thickness d.

4. The electrical connector according to claim 2, wherein the tail end of the contact portion is configured to elastically abut against the connecting portion at least after being in electrical contact with the external electrical contact sheet, so as to provide a reaction force to the contact portion, thereby increasing the forward force.

5. The electrical connector according to claim 1, wherein the connecting portion is configured to deflect with respect to a longitudinal axis after the contact portion is in electrical contact with the external electrical contact sheet, so as to adaptively implement a close contact fit.

6. The electrical connector according to claim 5, wherein a mounting cavity is defined in the first insulating shell, the electrical connecting components are detachably embedded in the mounting cavity, and a clearance is formed between the connecting portion and the mounting cavity.

7. The electrical connector according to claim 6, wherein the fixing portion is bent at a right angle and horizontally extends to form a step position, the step position is configured to prevent residual soldering flux from slipping to the connecting portion and the contact portion; the connecting portion leans against an inner wall of the mounting cavity, and the clearance between the connecting portion and the mounting cavity gradually increases from top to bottom.

8. The electrical connector according to claim 5, wherein a convex rib structure is disposed on the connecting portion, the convex rib structure extends along a width direction of the connecting portion, and the convex rib structure is integrally formed above the connecting portion for being in interference fit with the mounting cavity, so that a lower portion of the connecting portion is in a free state.

9. A board-to-board connector, comprising:

the electrical connector according to claim 1; and a connector being in plug-in fit with the electrical connector;

wherein the connector comprises a second insulating shell and electrical contact sheets, the electrical contact sheets are disposed on the second insulating shell, and the first insulating shell is plugged into the second insulating shell, so as to electrically connect the electrical connecting components with the electrical contact sheets.

10. An electronic device, comprising:

the board-to-board connector according to claim 9.

* * * * *